United States Patent
Apeagyei et al.

(10) Patent No.: US 9,605,104 B2
(45) Date of Patent: Mar. 28, 2017

(54) ANTIOXIDANT TREATMENT OF ASPHALT BINDERS

(75) Inventors: Alex K. Apeagyei, Urbana, IL (US); William G. Buttlar, Savoy, IL (US); Barry J. Dempsey, White Heath, IL (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 382 days.

(21) Appl. No.: 12/751,117

(22) Filed: Mar. 31, 2010

(65) Prior Publication Data

US 2010/0186629 A1 Jul. 29, 2010

Related U.S. Application Data

(62) Division of application No. 11/934,613, filed on Nov. 2, 2007, now abandoned.

(60) Provisional application No. 60/856,571, filed on Nov. 3, 2006.

(51) Int. Cl.
C08L 95/00 (2006.01)
C08G 16/02 (2006.01)
C08L 61/00 (2006.01)

(52) U.S. Cl.
CPC ..... *C08G 16/0237* (2013.01); *C08G 16/0293* (2013.01); *C08L 61/00* (2013.01)

(58) Field of Classification Search
None
See application file for complete search history.

(56) References Cited

U.S. PATENT DOCUMENTS

| 3,275,585 | A | 9/1966 | Baum et al. |
| 5,128,066 | A | 7/1992 | Stahly |
| 6,136,899 | A | 10/2000 | Lewandowski et al. |
| 2003/0113566 | A1 | 6/2003 | Clemens et al. |
| 2005/0222332 | A1 | 10/2005 | Nakagawa et al. |
| 2005/0284333 | A1* | 12/2005 | Falkiewicz .............. 106/284.04 |

OTHER PUBLICATIONS

International Preliminary Report on Patentability issued May 14, 2009 in related PCT Application No. PCT/US2007/083445.
Apeagyei, Alex Kwame; "Development of Antioxidant Treatments for Asphalt Binders and Mixtures" Urbana, Illinois, 2006, 275 pages.
Roberts et al., "Hot Mix Asphalt Materials, Mixture Design and Construction," $2^{nd}$ Ed. 1996, pp. 94-99.

* cited by examiner

*Primary Examiner* — Colin W Slifka
(74) *Attorney, Agent, or Firm* — Brinks Gilson & Lione

(57) ABSTRACT

A combination of antioxidants and method of incorporating the antioxidants into an asphalt binder to make a modified asphalt binder are described. The antioxidants comprise a thioester and an aldehyde. The aldehyde and thioester, in a ratio between about 1:100 and about 100:1 parts by weight, are added to an asphalt binder. An acidic catalyst is also added in a concentration between about 0.1 wt % and about 18 wt % of the asphalt binder. The antioxidants, asphalt binder, and catalyst are mixed at a temperature between about 85° C. and about 135° C. for a time between about 30 minutes and about 6 hours. The antioxidants are capable of improving the performance grade of the asphalt binder. The modified asphalt binder possesses superior resistance to oxidative age hardening compared to other modified asphalt binder compositions that incorporate various antioxidants.

16 Claims, No Drawings

ANTIOXIDANT TREATMENT OF ASPHALT BINDERS

RELATED APPLICATIONS

The present patent document is a divisional of application Ser. No. 11/934,613, filed Nov. 2, 2007 now abandoned, which claims the benefit of the filing date under 35 U.S.C. §119(e) of Provisional U.S. Patent Application Ser. No. 60/856,571, filed Nov. 3, 2006. All of the foregoing applications are hereby incorporated by reference.

BACKGROUND

The present invention relates to the modification of various materials, and more particularly to incorporation of antioxidants in asphalt binders to lower their oxidative aging.

Asphalt concrete is a composite material that is commonly used for construction of pavement. More than 95% of all pavements in service today incorporate asphalt concrete. Asphalt concrete includes an asphalt binder and mineral aggregate. The binder and aggregate are mixed together and then layered down and compacted.

The asphalt binder deteriorates during hot-mix production and service because of oxidative hardening. Oxidative hardening occurs as a result of the asphalt binder readily undergoing oxidation when it reacts with atmospheric oxygen at elevated temperatures. Asphalt binder is a hydrocarbon which generally consists of about 85% carbon, 10% hydrogen, 5% heteroatoms, and trace elemental atoms. The heteroatoms, which include sulfur, oxygen, and nitrogen, can form reactive functional groups that accelerate the oxidation process. The trace metals, which include vanadium, nickel, and iron, can act as catalysts for the oxidation reaction.

Furthermore, oxidation is an irreversible chemical reaction that can occur throughout the life of an asphalt pavement such as during mixing, field placement, and during service. Excessive oxidation of the asphalt may potentially cause the asphalt to harden, become brittle, and ultimately crack over time. This stiffening mechanism of the asphalt is also commonly termed "age hardening."

Currently, no effective treatments exist to control the excessive age hardening of the asphalt binder. Accordingly, there remains a need to increase the durability of the asphalt binder by reducing its oxidative age hardening.

SUMMARY

In one aspect, an antioxidant composition is provided that includes an aldehyde and a thioester. The ratio of the aldehyde to the thioester is between about 1:100 and about 100:1 parts by weight. The thioester and the aldehyde are capable of lowering oxidative aging of various materials.

In another aspect, a modified asphalt binder composition is made by the process comprising mixing an antioxidant composition comprising an acidic catalyst, an aldehyde and a thioester. The ratio of the aldehyde to the thioester is between about 1:50 and about 50:1. The mixing of the aldehyde and the thioester create a modified asphalt binder characterized by an aging index that is lower than that of an unmodified asphalt binder.

In another aspect, an antioxidant modified asphalt binder is prepared by the following process. The asphalt binder is heated in an oxidation rich environment to a temperature sufficient to liquefy the asphalt binder. An antioxidant is added to the asphalt binder in the presence of an acidic catalyst to form an antioxidant-asphalt binder blend. The antioxidant comprises an aldehyde. Water is formed in the first antioxidant-asphalt binder blend from a condensation reaction of the aldehyde with the asphalt binder. The water vaporizes off. Another antioxidant is added to the antioxidant-asphalt binder blend to form the antioxidant modified asphalt binder. The added antioxidant is a thioester that is added to the antioxidant-asphalt binder blend in a ratio of the aldehyde to the thioester that is between about 1:100 to about 100:1 parts by weight. The antioxidant modified asphalt binder is mixed until a sufficient stiffness of the binder has been attained.

In another aspect, a method of making a modified asphalt binder is described. A first antioxidant comprising an aldehyde is mixed with an asphalt binder at a temperature between about 100° C. to about 150° C. in the presence of an acidic catalyst to form a liquefied asphalt blend. Water is formed as a by-product of the condensation reaction and thereafter vaporizes off. A second antioxidant comprising a thioester is added to the liquefied asphalt blend to form the antioxidant modified asphalt binder. The contents are mixed until a sufficient stiffness of the modified asphalt binder has been attained.

The foregoing paragraphs have been provided by way of general introduction, and are not intended to limit the scope of the following claims. The presently preferred embodiments, together with further advantages, will be best understood by reference to the following detailed description.

DETAILED DESCRIPTION

The relationship and functioning of the various elements of this invention are better understood by the following detailed description. However, the embodiments of this invention as described below are by way of example only.

An asphalt binder may be modified by incorporating an antioxidant mixture therein to produce a modified asphalt binder that exhibits reduced age hardening. The modified asphalt binder possesses increased resistance to oxidation, thereby increasing the durability of the asphalt binder. For the purpose of this application, the antioxidant mixture used in a modified binder in accordance with the invention may be referred to as AOXADUR, which stands for Antioxidant Asphalt Durability Treatment.

The antioxidant mixture includes a combination of an aldehyde, a thioester, and an acidic catalyst. Aldehydes that may be used include, but are not limited to, aliphatic aldehydes and aromatic aldehydes, including heterocylic aldehydes. Examples of suitable aldehydes include formaldehyde, acetaldehyde, propionaldehydes, butyraldehyde, acrolein, crotonaldehyde, tiglaldehyde, benzaldehyde, salicylaldehyde, cinnamaldehyde, furfuryl alcohol, and furfural. Additionally, aldehydes in their polymeric forms such as paraformaldehyde may be utilized. The aldehydes may also comprise mixtures of aldehydes and aldehyde polymers.

Preferably, the aldehyde is furfural. Furfural, which is also known as furan-2-carboxaldehyde, is an aromatic aldehyde having the chemical formula $C_5H_4O_2$. Furfural readily dissolves in most polar organic solvents, but is only slightly soluble in water and alkanes. When heated above 250° C., furfural decomposes into furan and carbon monoxide. Without being bound by any theory, it is believed that furfural undergoes a chemical condensation reaction with aromatic phenols that are naturally contained in the asphalt binder in the presence of a mineral acid to form two major types of resins known as novolacs and resoles. The amount of novolacs or resoles formed during the condensation reaction may depend on the concentration of phenol to aldehyde ratio. Phenol to aldehyde ratios less than unity may result in the formation of resoles, which is a thermosetting resin. Phenol to aldehyde ratios greater than unity may result in the formation of novolacs, which is a thermoplastic resin. Preferably, for paving applications, the formation of resoles may be minimized while the formation of novolacs may be maximized because the novolacs may liquefy more readily than the resoles and the novolac resins may act as antioxidants. Because there are typically more aromatic phenols than the furfural additive levels, substantially all of the furfural reacts in the condensation reaction to form novolac resins. Polar aromatics, including the aromatic phenols, are contained in the asphalt binder and have been identified as one of the major aging fractions in the asphalt binders. Because furfural can readily react with the polar aromatics, furfural can assist with lowering the oxidation of the asphalt binder.

Furfural can be obtained commercially from many sources including Fisher Scientific. Furfural can also be produced by hydrolyzing the polysaccharide hemicellulose, which is a polymer of sugars found in plant materials. When heated with sulfuric acid, the hemicellulose hydrolyzes into xylose. Further hydrolysis of the xylose yields furfural: $C_5H_{10}O_5 \rightarrow C_5H_4O_2 + 3H_2O$ As mentioned, the condensation reaction that furfural undergoes with the phenols in the asphalt binder requires the presence of an acidic catalyst. The acidic catalyst may include any strong acid, including sulfuric acid, toluene sulfonic acid, paratoluene sulfonic acid, ascorbic acid, phosphoric acid, and hydrochloric acid. Preferably, the acid catalyst is hydrochloric acid.

The antioxidant mixture also includes a thioester. Thioesters are organo-sulfur compounds formed by the bonding of sulfur and an alkyl group (R) that is attached to a carbon-oxygen double bond. A thioester has the general formula R—S—CO—R' and forms from the reaction of a thiol (R—SH) and a carboxylic acid (R'—COOH). Thioesters can act as both a primary antioxidant and a secondary antioxidant. Thioesters act as a primary antioxidant by donating hydrogen atoms to the asphalt peroxy free radical, ROO., to form a stable compound that breaks the oxidation chain of reactions. The asphalt peroxy free radical is formed when the asphalt molecule (RH) is converted via heat to a free radical (R.), which subsequently reacts with oxygen to form the peroxy free radical ROO.

Thioesters can also act as a secondary antioxidant. In the absence of enough primary antioxidant molecules, the peroxy free radicals ROO. will react with other asphalt molecules (RH) to form new asphalt free radicals (R.) and hydroperoxide (ROOH). Hydroperoxide is unstable and will react with new asphalt molecules to propagate the oxidative degradation process in the absence of secondary antioxidants. However, the thioester can react with hydroperoxide to be reduced to an alcohol (ROH), thereby ending the chain of oxidative degradation reactions.

Any type of thioester is contemplated. Examples of other types of thioesters include dilauryl thiodipropionate, distearylthiodipropionate, dimethyl 3,3'-thiodipropionate, and other esters of thiodipropionic acid. Preferably, the thioester is dilaurylthiodipropionate (DLTDP). DLTDP can be obtained commercially from the Struktol Company of America as CARSTAB DLTDP. DLTDP can also be obtained commercially from many other chemical producers. DLTDP may be bound to the asphalt binder during mixing of the asphalt binder under high shear rates. Binding the DLTDP to the asphalt binder results in a stabilized antioxidant which will not leach out over time. Volatization/leaching out of lead-based and other types of antioxidants has been a problem that lowers the effectiveness of the modified asphalt binder to resist oxidation. It has been observed that asphalt binders incorporating lead-based antioxidants have a tendency to lose their resistance to oxidative age hardening after about five years because the lead-based antioxidants have been found to leach out over time, thereby rendering them ineffective as an antioxidant for the asphalt binder. It is believed that the ability of the thioester to be stabilized onto the asphalt binder by binding it thereto ensures that the modified asphalt binder continues to maintain its resistance to oxidative age hardening over time. Another problem with prior antioxidant use in paving asphalt is the tendency for the antioxidants to excessively soften the modified asphalt, thereby rendering them prone to rutting and/or limiting their use to only colder temperatures. The invention disclosed here may not only prevent softening of the asphalt, but may actually expand both the high and low temperature ranges at which the modified asphalt can be used, as will be discussed in greater detail with respect to Table 5 and Examples 32-34.

Any type of asphalt binder may be used. Examples of paving grade asphalt binders include the Penetration Grade such as 40-50, 60-70, 85-100, 120-150, and 200-300; the Viscosity Grade such as AC-2.5, AC-5, AC-10, AC-20, AC30, AC-40, AR-1000, AR-4000, AR-8000, and AR-16000; and all of the Performance Grade ranging from PG 46-46 to 82-34. Asphalt of all SUPERPAVE codes and crude sources could be used. Examples include AAO from Mid-East; AAA-1 from Lloydminster; AAB-1 from Wyoming; AAC-1 from Redwater; AAD-1 from California Coastal; AAF-1 from West Texas Sour; AAG-1 from California Valley; AAK-1 from Boscan, Venezuela; AAT from Maya Blend; AAV from Alaska North Slope; AAW from West Texas-Maya Blend; etc. Additional examples include asphalts used for Tack Coat, prime coat, seal coat, recycled asphalt, surface treatment, joint sealants, landfill liners, recreational facilities, warm mix and cold mix including cut-back and emulsions, natural asphalt, rock asphalt, and Trinidad Lake asphalt. Roofing Grade Asphalts may also be used. PG 64-22 binders from Illinois and Wisconsin refineries as well as an AAD-1 asphalt sample from the SHRP Materials Reference Laboratory were used in the examples discussed below to illustrate the invention. The asphalt samples were selected to demonstrate the effectiveness of the invention in asphalts of different grades and crude source. The PG 64-22 binder from Illinois was obtained from Emulsicoat, Inc. of Urbana, Ill.

Preferably, the antioxidant modified asphalt binder may be prepared as follows. The asphalt binder is heated at atmospheric pressure in an oxidation rich environment to a temperature sufficient to liquefy the asphalt binder. This temperature ranges from about 80° C. to about 150° C. Each of the antioxidant additives are then added to the asphalt binder. Hydrochloric acid and furfural are added to the liquefied asphalt binder. They generally comprise about 0.1 wt % to about 18 wt % HCl and about 0.1 wt % to about 30 wt % furfural based on the weight of the asphalt binder. Preferably, the HCL and furfural each comprise about 0.1 wt % to about 10 wt %. More preferably, the HCl and furfural each comprise about 0.1 wt % to about 3 wt %. The contents are contained in a reactor vessel with a mixer. The contents are continuously mixed within the reactor vessel. The furfural in the presence of the hydrochloric acid catalyst reacts with the polar aromatics of the asphalt binder in a condensation reaction. The reaction is carried out at a temperature that is sufficiently high to effectuate condensation between the furfural and the asphalt binder in the presence of the hydrochloric acid but yet not sufficiently high to significantly oxidize and age the asphalt. This temperature generally ranges from about 100° C. to about 135° C. Water is formed as a by-product and vaporizes off. The time of the reaction will vary inversely with the temperature and may be carried out over a period varying from about 5 minutes to as high as about 6 hours.

The DLTDP is added to the furfural-catalyst-asphalt binder mixture. DLTDP generally comprises about 0.1 wt % to about 22.5 wt % based on the weight of the asphalt binder. Preferably, DLTDP comprises about 0.1 wt % to about 10 wt %. More preferably, DLTDP comprises about 0.1 wt % to about 3 wt %. The ratio of the furfural to the DLTDP may range between about 1:100 to about 100:1 parts by weight and preferably about 1:50 to about 50:1, and more preferably about 1:5 to 5:1. The contents are continuously mixed within the reactor vessel for a time sufficient for the modified asphalt binder to attain a desired stiffness. The temperature of the mixture may range from about 85° C. to about 135° C. Because the time of the reaction varies inversely with the temperature of the mixture, about 30 minutes is sufficient to prepare the modified binder when the mixture is at about 135° C. and about 6 hours is sufficient to prepare the modified binder when the mixture is at about 85° C. However, mixing is stopped before the modified asphalt binder becomes too stiff to coat or spray onto a mineral aggregate. The still free-flowing modified asphalt binder is removed from the mixer and is ready to be coated or sprayed onto a mineral aggregate.

Preferably, continuous mixing of the furfural, hydrochloric acid and asphalt binder occurs for a time sufficient to generate high shear mixing that enables subsequent addition of the DLTDP to bind to the asphalt binder. Previous studies indicate that under extensive mixing conditions, DLTDP is capable of binding to its substrate. Although a bound DLTDP can decrease its loss from the modified asphalt binder, it is not necessary for the DLTDP to be bound. The DLTDP may still function as an antioxidant without being bound to the modified asphalt binder. Incorporating an unbound DLTDP into the asphalt binder allows the DLTDP to be added to the asphalt binder shortly after the furfural and hydrochloric acid are added, or even at the same time that the furfural and the hydrochloric acid are added, thereby reducing the preparation time of the modified asphalt binder.

Additionally, an antistripping agent may be added to the modified asphalt binder to increase the adhesion of the asphalt binder with the mineral aggregate. Stripping may occur when there is a loss of a bond between the asphalt binder and the mineral aggregate in the presence of water. A variety of antistripping agents may be used to increase the stripping resistance of the asphalt-coated mineral aggregate. These include lime, amines, phenol, furfural, a phenol-furfural mixture and/or its resinous derivatives, and an aniline-furfural mixture and/or its resinous derivatives. Conventional antistripping additives may also be used, as are known to one of ordinary skill in the art.

After the modified asphalt binder is formed, it is sprayed or coated onto a mineral aggregate. The temperature of the binder-aggregate mixture during this spraying/coating process is generally higher than the temperature during addition of the antioxidants to the asphalt binder to form the modified asphalt binder. The binder-aggregate mixture ranges from about 125° C. to about 200° C. The particular temperature varies with the type of asphalt grade. After the aggregate has been sprayed or coated with the modified asphalt binder, compaction of the coated aggregate occurs to produce a laydown of asphalt concrete. The compaction of the coated aggregate occurs at a temperature ranging from about 120° C. to about 150° C.

Although incorporation of the antioxidants has been described as occurring in the molten asphalt stage as a batch preparation, other alternatives are contemplated. For example, the antioxidants can be added in a continuous process to the asphalt binder before it is mixed with the mineral aggregate by metering the antioxidants to the asphalt binder while the binder is flowing through a line such as a feed line to a mixing plant or a truck-loading line. Alternatively, rather than prepare batch quantities in a reactor mixing vessel, the antioxidants may be incorporated as batch additions into a fixed quantity of asphalt in the asphalt supplier's tank, or in the tank of the truck delivering the asphalt to the mixing plant. Heating and storage temperatures of the AOXADUR modified asphalt binders may be the same as conventional binders.

As an alternative to preparing the modified asphalt binder as described above, a highly concentrated master batch of a modified asphalt binder may be produced. The highly concentrated master batch may contain up to 30 wt % of hydrochloric acid and 30 wt % of each of the antioxidants based on the weight of the master batch. The modified asphalt binder could then be mixed with a portion of the master batch to produce a binder that could then be sprayed or coated onto the mineral aggregate. For example, a relatively small portion of the concentrated master batch of modified asphalt may be mixed with a relatively large portion of an unmodified asphalt binder to form a resultant binder having a range from about 10 wt % to about 20 wt % of the concentrated modified asphalt. A highly concentrated master batch of the modified asphalt is advantageous because it eliminates handling of the antioxidants and the corrosive acid catalyst by the end user, thereby making use of the modified asphalt binder safer. Additionally, the end user does not have to deal with mixing the antioxidants in the predetermined ratios, thereby simplifying the process for the asphalt end user.

Examples 1-4

A general procedure for preparing a modified asphalt binder is as follows. The preparation of the modified asphalt binder may occur as a batch or a continuous process. An asphalt binder feeds into a reactor vessel and is heated to a temperature sufficient to liquefy the asphalt binder. This temperature varies with the specific type of asphalt binder used, but typically ranges from about 80° C. to about 150° C. After the asphalt binder has liquefied, a combination of antioxidants is added to the reactor vessel. An acidic catalyst and aldehyde antioxidant are added to the liquefied asphalt binder. The asphalt binder, aldehyde antioxidant, and acidic catalyst are mixed in the reactor vessel. The aldehyde antioxidant in the presence of the acidic catalyst reacts with the polar aromatics of the asphalt binder in a condensation reaction. The reaction is carried out at a temperature that is sufficiently high to effectuate condensation between the aldehyde antioxidant and the asphalt binder in the presence of the acidic catalyst. This temperature generally ranges from about 100° C. to about 135° C. Water is formed as a by-product and vaporizes off. The time of the reaction will vary inversely with the temperature and may be carried out over a period varying from about 5 minutes to as high as about 6 hours.

A second antioxidant is then added to the aldehyde-acidic catalyst-asphalt binder mixture. The second antioxidant is a thioester. All of the contents are continuously mixed within the reactor vessel for a time sufficient for the modified asphalt binder to attain a desired stiffness. The temperature of the mixture may range from about 85° C. to about 135° C. Because the time of the reaction varies inversely with the temperature of the mixture, about 30 minutes is sufficient to prepare the modified binder when the mixture is at about 135° C. and about 4 hours is sufficient to prepare the modified binder when the mixture is at about 85° C. However, mixing is stopped before the modified asphalt binder becomes too stiff to coat or spray onto a mineral aggregate. The still free-flowing modified asphalt binder is removed from the mixer and is ready to be coated or sprayed onto a mineral aggregate.

Table 1 indicates that various amounts of the aldehyde-thioester antioxidant combination can be added to the asphalt binder. The weight percentages are based on unmodified asphalt binder. Additionally, Table 1 indicates that various types of aldehydes and thioester can be used to form the modified asphalt binder. Example numbers 1 and 2 show the amounts of furfural and DLTDP that may be used in a batch, continuous, or semi-continuous process. Example numbers 3 and 4 show the amounts of a concentrated masterbatch comprising furfural and DLTDP. A relatively small portion of the concentrated masterbatch of example 3 or 4 could be mixed with a relatively large portion of an unmodified asphalt binder to form a resultant binder having a predetermined concentration range. Other types of aldehydes and thioesters could be formulated using additives levels shown in Table 1.

eter. AI is based on binder stiffness at multiple temperatures. AI is defined as the ratio of the value of a rheological parameter after aging to the value of the rheological parameter before aging. The specific rheological parameter used depends on whether oxidative aging is simulated under high pavement temperatures (the high temperatures defined in SUPERPAVE) or low pavement temperatures (the low temperatures defined in SUPERPRAVE). The AI shown in Table 2 is computed at high temperatures and is based on a rutting parameter, which is calculated as G*/Sin δ. G* is the stiffness of the tested binder and δ is the phase lag of the tested binder as it responds to a load. The rutting parameter is a typical way of characterizing the extent of deformation the binder undergoes at high pavement temperatures in accordance with SUPERPAVE protocol. Incorporation of the antioxidant combination of 2.0 wt % furfural, 1.5 wt % DLTDP, and 1.2 wt % HCl to the binder produces a modified asphalt binder (AOXADUR) having the lowest aging index value, as indicated in Table 2. The effects of several other antioxidants including Irganox 1010, Carbon Black, Vitamin E on Asphalt A are also compared. The lower the aging index, the higher the resistance of the asphalt binder to oxidative aging, thereby increasing the durability and life of the modified asphalt binder. Example No. 5 indicates that additions of the antioxidant mixture of 2% Furfural+1.5% DLTDP+1.2% HCl incurs the least amount of age hardening, as denoted by the low aging index (AI=1.44). Additions of the test antioxidant mixtures in example nos. 6-17 show higher levels of age hardening, as indicated by the higher AI values.

TABLE 1

Antioxidant Compositions

| Example No. | Aldehyde | Thioester | Acidic Catalyst | Aldehyde Weight % | Thioester Weight % | Acidic Catalyst % |
|---|---|---|---|---|---|---|
| 1 | Furfural | DLTDP | HCl | 2.0 | 1.5 | 1.2 |
| 2 | Furfural | DLTDP | HCl | 14.8 | 9.2 | 12.1 |
| 3 | Furfural | DLTDP | HCl | 20.0 | 12.0 | 15.0 |
| 4 | Furfural | DLTDP | HCl | 30.0 | 18.0 | 22.0 |

Examples 5-17

PG 64-22 base asphalt (commercially available from Emulsicoat, Inc.) is modified by incorporating 1.2 wt % HCl (commercially available from Fisher Scientific), 2.0 wt % furfural (obtained commercially from Fisher Scientific and Sigma-Aldrich), and 1.5 wt % DLTDP (commercially available from Struktol Company of America as CARSTAB DLTDP). Weight percentages are based on the weight of the base asphalt. The heating and mixing of the mixtures are accomplished using a convection oven fitted with a Barnant Mixer. Mixing of all the modified asphalt is done in quartz-size paint cans using about 350 g of asphalt per batch. The ratio of the polar aromatics (e.g., phenols) contained in the asphalt to the furfural is greater than 1. HCl and furfural are added to the asphalt, followed by DLTDP. The total mixing time is four hours. Mixing temperature is kept constant at about 115° C. The DLTDP is added after the second hour in three divided portions. The purpose of delaying additions of DLTDP is (i) to allow the furfural to completely react with all of the aromatics and (ii) to create a high shear mixing to allow the DLTDP to "bind" to the asphalt.

The effectiveness of the antioxidants in reducing age-hardening is evaluated using the Aging Index (AI) param-

TABLE 2

Screening of Various Antioxidant

| Example No. | AI based on rutting parameter | Antioxidant Concentration |
|---|---|---|
| 5 | 1.44 | 2% Furfural + 1.5% DLTDP + 1.2% HCl |
| 6 | 1.46 | 2% Furfural + 1.2% HCl |
| 7 | 1.63 | 2% Furfural + 1.5% Irganox 1010 + 1.2% HCl |
| 8 | 1.72 | 2% Furfural + 2% Vitamin E + 1.2% HCl |
| 9 | 1.73 | 1.5% DLTDP + 5% Carbon Black |
| 10 | 1.73 | 2% Furfural + 2% Vitamin E + Catalyst |
| 11 | 1.86 | 2% Furfural |
| 12 | 1.94 | 1.5% DLTDP mix for 4 hours |
| 13 | 1.96 | 1.5% DLTDP mix for 1 hour |
| 14 | 2.01 | 2% Vitamin E |
| 15 | 2.01 | 5% Irganox 1010 |
| 16 | 2.02 | 0.5% DLTDP |
| 17 | 2.32 | Control PG 64-22 (Asphalt A) |

Table 2 indicates that the combination of the DLTDP with the furfural creates a synergistic effect in the reduction of the oxidative aging of the asphalt binder. Accordingly, the most effective antioxidant treatment is determined to be 2% Furfural+1.5% DLTDP+1.2% HCl based on the fact that it has the lowest aging index.

Examples 18-29

Having identified the most effective antioxidant mixture in Table 2, further effects of this antioxidant mixture may be described for various asphalt binders. Tables 3a-3c shows the results of the most effective additive levels of the antioxidant mixture (2% Furfural+1.5% DLTDP+1.2% HCl) on four asphalt binders. PG 64-22 base asphalt binders A and B are commercially available from Emulsicoat, Inc. of Urbana. Asphalt C is also a PG 64-22 binder that is available from Seneca Petroleum Company and was obtained from a Wisconsin source. Asphalt D is an AAD-1 binder available from SHRP MRL. Furfural samples for modifying Asphalt A are available from Fisher Scientific. Furfural samples for modifying Asphalt B, C, and D are available from Sigma-Aldrich. All of the asphalts used HCl available from Fisher Scientific, and DLTDP available from Struktol Company of America as CARSTAB DLTDP.

AI is evaluated under short-term aging conditions at 64° C. (Table 3a), in accordance with SUPERPAVE protocol. The short-term agings are simulated using a Rolling Thin Film Oven (RTFO), as is known to one of ordinary skill in the art. A Dynamic Shear Rheometer (DSR) is used to compute a SUPERPAVE rutting parameter $G^*/\sin\delta$ at high pavement temperatures (Figure 3a) and a SUPERPAVE fatigue parameter at intermediate temperatures (Figure 3b).

Table 3a indicates that the modified binders have relatively lower aging indices (AI) compared to the control asphalt binders. The AI is based on short-term aging at a high temperature. The AI is computed as the ratio of the rutting parameter of the material after short term aging to the rutting parameter unaged. Example Nos. 18-21 indicate that the unmodified asphalt binders A, B, C, and D incur higher stiffness after the short-term aging as compared to the modified binders A, B, C, and D. For example, short-term aging results in more than a two fold increase in stiffness due to oxidative aging of the unmodified binder A (AI of 2.32) but only a 44% increase in modified binder A (AI of 1.44). Additionally, unmodified binder D incurs about a two fold increase in stiffness (AI of 2.02) but the modified binder D incurs virtually no increase in stiffness (AI of 1.04). Additionally, unlike antioxidant treatments of the prior art, the current antioxidant treatment does not result in excessive softening of the modified asphalt. This is especially a desirable property for paving grade asphalt where adequate structural rigidity is required.

Comparison of Oxidative Aging Indexes

TABLE 3a

Short-term aging at high temperature

| Example Number | Sample | Rutting parameter $G^*/\sin\delta$ at 64° C. (kPa) | | |
|---|---|---|---|---|
| | | Tank | RTFO | Aging Index |
| 18 | A | 1.2446 | 2.8892 | 2.32 |
| | A + AOXADUR | 1.9019 | 2.7480 | 1.44 |
| 19 | B | 1.3099 | 3.3823 | 2.58 |
| | B + AOXADUR | 3.4964 | 4.6302 | 1.32 |
| 20 | C | 1.2338 | 3.3174 | 2.69 |
| | C + AOXADUR | 3.1124 | 6.7150 | 2.16 |

TABLE 3a-continued

Short-term aging at high temperature

| Example Number | Sample | Rutting parameter $G^*/\sin\delta$ at 64° C. (kPa) | | |
|---|---|---|---|---|
| | | Tank | RTFO | Aging Index |
| 21 | D | 1.3643 | 2.7620 | 2.02 |
| | D + AOXADUR | 14.2070 | 14.7960 | 1.04 |

Table 3b indicates that AI is evaluated under long-term aging conditions at an intermediate temperature of 25° C. in accordance with SUPERPAVE protocol. The long-term aging conditions at 25° C. are simulated using a Pressure Aging Vessel (PAV), as is known to one of ordinary skill in the art. The AI is computed as the ratio of the fatigue parameter of the material after long-term aging to the fatigue parameter of the unaged material. The fatigue parameter is a standard way as known to one of ordinary skill in the art for characterizing long-term aging of test material at intermediate temperature. Example Nos. 22-25 indicate that the unmodified asphalt binders A, B, C, and D incur higher stiffness after the long-term aging as compared to the modified binders A, B, C, and D. For example, long-term aging results in more than a five-fold increase in the stiffness of unmodified binder A (AI of 5.24) but slightly over a three fold increase in the stiffness of modified binder A (AI of 3.17). Additionally, although the unmodified binder D incurs over a five-fold increase in stiffness (AI of 5.55), the modified binder D incurs about a three-fold increase in stiffness (AI of 2.88).

TABLE 3b

Long-term aging at intermediate temperature

| Example Number | Sample | Fatigue parameter $G^*\sin\delta$ at 25° C. (kPa) | | |
|---|---|---|---|---|
| | | Tank | PAV | Aging Index |
| 22 | A | 917 | 4807 | 5.24 |
| | A + AOXADUR | 853 | 2703 | 3.17 |
| 23 | B | 890 | 4629 | 5.20 |
| | B + AOXADUR | 1121 | 3604 | 3.22 |
| 24 | C | 647 | 3322 | 5.13 |
| | C + AOXADUR | 687 | 2306 | 3.36 |
| 25 | D | 404 | 2240 | 5.55 |
| | D + AOXADUR | 875 | 2520 | 2.88 |

Table 3c indicates that AI is evaluated under long-term aging conditions at a low temperature of −12° C. in accordance with SUPERPAVE protocol. The long-term aging conditions at low temperature are simulated by using a Pressure Aging Vessel (PAV) to subject the test binder material to a load associated at −12° C. for 60 seconds, in accordance with SUPERPAVE. The long-term aging at low temperature is designed to evaluate the extent to which unmodified binder and modified binder material thermally crack as the material shrinks due to the residual stress within the material. A Bending Beam Rheometer (BBR) was used to evaluate the performance of the modified binders at the low pavement temperatures.

The extent to which the material thermally cracks at low temperature can be described by the material's flexural stiffness, S(t), and its m-value, which is defined as the rate at which the thermally-induced stress is relieved in the material. A high m-value corresponds to the ability of the material to flow faster and thereby relieve the thermally-induced stress. A low m-value corresponds to a slower rate at which the stress in the material is relieved. Example Nos. 26-29 indicate that the unmodified asphalt binders A, B, C, and D incur higher flexural stiffness after the long-term aging as compared to the modified binders A, B, C, and D. Additionally, modified binders A, B, and C exhibited relatively higher m-values as compared to their respective unmodified binders. This indicates that the modified binders have the ability to relieve the thermally-induced stress faster than the unmodified material.

TABLE 3c

Long-term aging at low temperature

| Example Number | Sample | Flexural stiffness at −12 C., 60 seconds | |
|---|---|---|---|
| | | S(t) | m-value |
| 26 | A | 146 | 0.42 |
| | A + AOXADUR | 86 | 0.46 |
| 27 | B | 207 | 0.31 |
| | B + AOXADUR | 131 | 0.32 |
| 28 | C | 111 | 0.31 |
| | C + AOXADUR | 76 | 0.33 |
| 29 | D | 74 | 0.38 |
| | D + AOXADUR | 64 | 0.35 |

Examples 30-31

Table 4 shows that the addition of DLTDP results in lowering the stiffness of the base asphalt while the addition of furfural with the HCl catalyst results in significant increase in binder stiffness. The combination of the DLTDP and the furfural produces the desirable property of exhibiting relatively lower stiffness than unmodified asphalt binders at lower temperatures while exhibiting relatively higher stiffness than unmodified asphalt binders at higher temperatures, as shown in Table 4 for Asphalt A. The low temperature at which stiffness is tested is −12° C. in accordance with the SUPERPAVE specification for PG 64-22 asphalt binder. The high temperature at which stiffness is tested is 64° C., which is also in accordance with the SUPERPAVE specification, and is incorporated in its entirety herein by reference. It can be seen from Table 4 that at low temperatures binder A is 70% stiffer than the antioxidant modified binder, which indicates a higher potential for thermal cracking of the unmodified asphalt binder A. At high temperatures where higher stiffness is desirable, the unmodified binder is 18% softer than the modified binder.

TABLE 4

Comparison of Binder Stiffness For Asphalt Binder A

| Example Nos. | Stiffness at −12° C. (MPa) | Stiffness at 64° C. (MPa) | Description |
|---|---|---|---|
| 30 | 85.7 | 0.0152 | Antioxidant-modified |
| 31 | 145.6 | 0.0125 | Unmodified Asphalt Binder (A) |

This is a desirable property for asphalt binders to possess. At lower temperatures, pavements shrink, thereby causing the asphalt in the pavement to be put in tension. If the asphalt binder is unable to elongate through ductile flow and the tensile strength of the asphalt is exceeded, it breaks in brittle fracture. Because the asphalt binder becomes relatively less stiff at the lower temperatures, it can release the tensile stresses by ductile flow, thereby preventing cracking from occurring. At higher temperatures, the pavement expands and becomes pseudo-viscoelastic. Because the modified asphalt binder becomes relatively stiffer at higher temperatures, it may reduce rutting susceptibility (i.e., the extent to which the binder undergoes deformation). Accordingly, it is desirable for the asphalt binder to be relatively stiffer because the asphalt binder has a tendency to rut or deform at the higher temperatures.

Examples 32-34

In addition to reducing oxidative aging and reducing rutting susceptibility, the antioxidant mixtures disclosed herein may extend the temperature range that the binder may be used within. A performance grade designation is used to quantify the temperature range. For example, a performance grade of PG 64-22 indicates that the binder can withstand the load specifications set forth in SUPERPAVE at temperatures as high as 64° C. and temperatures as low as −22° C. Stiffness is a desirable property for asphalt to have at the higher temperatures because the asphalt tends to soften at such high temperatures. Flowability and the ability to relieve thermally-induced stress is a desirable property for asphalt to have at the lower temperatures because the asphalt tends to thermally crack at the lower temperatures.

The results of Table 5 show that addition of the antioxidant mixture imparts stiffness to the binder at the higher temperatures and imparts ductility at the low temperatures. Specifically, Table 5 shows that incorporation of the antioxidant mixture of 2% Furfural+1.5% DLTDP+1.2% HCl to binder C improves its grade from PG 64-22 to PG 70-28. In other words, binder C expands by two grades, each grade being defined in increments of 6° C. Similarly, using the same antioxidant mixture improves the grade of binder D from PG 64-22 to PG 76-28, which is an expansion of three grades. The grade of binder B improves from PG 64-22 to PG 70-22, which is an expansion of one grade.

As shown in Table 5, in order for a binder to be graded at a particular level, it must pass four tests. They are the unaged test, short-term aging test, long-term aging test, and creep stiffness test. These tests are in accordance with SUPERPAVE requirements. Essentially, in accordance with SUPERPAVE, a predetermined level of stiffness is required at high, intermediate, and low temperatures for the binder to maintain adequate structural rigidity for pavement applications. If the binder passes each of the four tests, then it is considered suitable for application at that particular grade.

The requirements of each test will now be discussed. The unaged test evaluates rutting susceptibility (i.e., the tendency to deform which is computed as $G^*/\sin \delta$) of unmodified and modified binders C, D, and B at the high temperatures of 64° C., 70° C., 76° C., and 82° C. In accordance with SUPERPAVE, in order for the binder to pass the unaged test at each of the high temperatures, it must exhibit a stiffness greater than 1.0 kPa. The short-term aging test evaluates rutting susceptibility of the unmodified and modified binders at 64° C., 70° C., 76° C., and 82° C. for a predetermined short period of time as defined in SUPERPAVE. In accordance with SUPERPAVE, in order for the binder to pass the short-term aging test at each of the high temperatures, it must exhibit a stiffness greater than 2.2 kPa. The long-term aging test evaluates fatigue cracking, which is computed as $G^*\sin \delta$, at the intermediate temperatures of 22° C. and 25° C. for a predetermined long period of time as defined in SUPERPAVE. In accordance with SUPERPAVE, in order for the binder to pass the long-term aging test at each of the intermediate temperatures, it must exhibit a stiffness less than 5.0 MPa. For the unaged, short-term aging, and long-term aging tests, a dynamic shear force was applied by a test machine.

The creep stiffness test evaluates thermal cracking at −22° C. Pursuant to SUPERPAVE, in order for the binder to pass the creep stiffness test it must exhibit a creep stiffness less than 300 MPa and a m-value greater than 0.3, where the m-value is defined as the rate at which stress is relaxed. In other words, the slope of the curve of logarithm of stiffness versus logarithm of time at a given time (60 seconds as specified in SUPERPAVE) is the m-value.

Table 5 demonstrates that modification of each of the binders with the antioxidant mixture of 2% Furfural+1.5% DLTDP+1.2% HCl expands the grade of the material, thereby increasing the high and/or low temperature ranges of the binders. Referring to the unaged test, each of the modified binders increases in stiffness at 64° C. For example, modified binder C increases in stiffness from 1.2338 (unmodified binder C) to 3.1124. Notably, binder D increases in stiffness by about 14 fold compared to unmodified binder D. Additionally, the unaged test indicates that modified binder D passes the requirements for the unaged tests (i.e., exhibiting a stiffness greater than 1.0 kPa) for the highest tested temperature of 82° C., which represents an improvement of three grades at the higher temperature (from PG-64 to PG-82). Binders C and B passes the requirements for the unaged tests at 70° C., which represents an improvement of one grade. These are desirable results because the binder materials tend to flow at the higher temperatures due to their viscoelastic properties. To counteract this tendency, a predetermined level of stiffness is required to maintain structural rigidity.

Referring to the short-term aging test, each of the modified binders increases in stiffness at 64° C., which is desirable because the increased stiffness imparted by the antioxidant mixture counteracts the tendency of the binder to viscoelastically flow at the high temperature. Additionally, modified binder D improves two grades by exhibiting a stiffness above the required 2.2 kPa at 76° C. Modified binders C and B improve one grade by exhibiting stiffness levels above the required 2.2 kPa at 70° C.

Referring to the long-term aging tests, modification of binders C and B result in lower G*Sin δ values at 25° C. Lower G*Sin δ values translates into softer materials. Because this test evaluates fatigue cracking, at 25° C., softer materials are desirable to counteract the tendency to fatigue crack. Although modified binder D does not become softer upon addition of the antioxidant mixture, it remains at the same grade, PG-28 grade, with respect to the low temperature.

Creep stiffness values are obtained at −12° C. and −18° C. to assess thermal cracking. The creep stiffness values at −12° C. and −18° C. are equivalent to the values that would have been obtained at −22° C. and −28° C. Because testing at about −22° C. and about −28° C. would have required substantially longer testing times, asphalt's time-temperature superposition principle is utilized so that the binder incurs the same stiffness from a load applied at −12° C. and 2 minutes as it would incur from a load applied at −22° C. and 2 hours. Lower stiffness values are obtained for each modified binder C, D, B at −12° C. (equivalent to −22° C.) and −18° C. (equivalent to −28° C.). These results indicate that the modified material is better able to flow and dissipate thermally-induced stress at the lower temperatures as compared to the unmodified binders. Additionally, the higher m-values for modified binder C and modified binder B indicate that the rate at which stress is relaxed is higher in the modified binders C and B.

The overall results of the tests are given in the last row. The last row of Table 5 indicates the improved grades for modified binders C, D, and B. For example, modified binder C improves from PG 64-22 to PG 70-28. In other words, modified binder C is suitable for pavement applications as high as 70° C. and as low as −28° C. Modified binder D improves from PG 64-28 to PG 76-28, and modified binder B improves from PG 64-22 to PG 70-22.

Typically, polymers and other additives are frequently used to increase the useful temperature range of binders. However, such additives tend to increase the price of the binder by as much as about 200%. Incorporation of the antioxidant mixture disclosed herein offers a more economical alternative for achieving the same result. Additionally, prior antioxidant use in paving asphalt has tended to excessively soften the modified asphalt, thereby rendering them prone to rutting and/or limiting their use to only colder temperatures. The antioxidant mixture disclosed herein was not observed to excessively soften the asphalt binder.

TABLE 5

SUPERPAVE performance grade of antioxidant-modified asphalt binder

| Properties | Asphalt Binder C Example 32 | Asphalt Binder C + AOX | Asphalt Binder D Example 33 | Asphalt Binder D + AOX | Asphalt Binder B Example 34 | Asphalt Binder B + AOX |
|---|---|---|---|---|---|---|
| Unaged Dynamic Shear (kPa) >1.0 | | | | | | |
| G*/Sinδ at 64° C. | 1.2338 | 3.1124 | 1.3643 | 14.207 | 1.3099 | 3.4963 |
| G*/Sinδ at 70° C. | <1 (fail) | 1.6456 | <1 (fail) | <1 (fail) | <1 (fail) | 1.7377 |
| G*/Sinδ at 76° C. | <1 (fail) | <1 (fail) | <1 (fail) | 3.3329 | <1 (fail) | <1 (fail) |
| G*/Sinδ at 82° C. | <1 (fail) | <1 (fail) | <1 (fail) | 1.4975 | <1 (fail) | <1 (fail) |
| Short-Term Aging Dynamic Shear (kPa) >2.2 | | | | | | |
| G*/Sinδ at 64° C. | 3.3174 | 6.715 | 2.762 | 14.796 | 3.3402 | 4.6302 |
| G*/Sinδ at 70° C. | <2.2 (fail) | 2.9461 | <2.2 (fail) | <2.2 (fail) | <2.2 (fail) | 2.241 |
| G*/Sinδ at 76° C. | <2.2 (fail) | <2.2 (fail) | <2.2 (fail) | 3.9439 | <2.2 (fail) | <2.2 (fail) |
| G*/Sinδ at 82° C. | <2.2 (fail) | <2.2 (fail) | <2.2 (fail) | <2.2* (fail) | <2.2 (fail) | <2.2 (fail) |
| Long-Term Aging Dynamic Shear (MPa) <5.0 | | | | | | |

TABLE 5-continued

SUPERPAVE performance grade of antioxidant-modified asphalt binder

| Properties | Asphalt Binder C Example 32 | Asphalt Binder C + AOX | Asphalt Binder D Example 33 | Asphalt Binder D + AOX | Asphalt Binder B Example 34 | Asphalt Binder B + AOX |
|---|---|---|---|---|---|---|
| G*Sinδ at 22° C. | | 3.3285 | 3.4052 | 3.3486 | | 5.0178 |
| G*Sinδ at 25° C. | 3.3223 | 2.3061 | 2.2402 | 2.5204 | 4.6965 | 3.6043 |
| Creep Stiffness (MPa) <300 | | | | | | |
| Stiffness at −12° C. | 111 | 76 | 74 | 64 | 207 | 131 |
| Stiffness at −18° C. | 227 | 149 | | 141 | | 266 |
| m-value >0.3 | | | | | | |
| m-value at −12° C. | 0.31 | 0.33 | 0.38 | 0.35 | 0.3121 | 0.32 |
| m-value at −18° C. | 0.29 | 0.3 | | 0.33 | | 0.28 |
| Possible PG grade | PG 64-22 | PG 70-28 | PG 64-28 | PG 76-28 | PG 64-22 | PG 70-22 |

Example 35

The modified asphalt binder batches incorporating the 2.0 wt % furfural, 1.5 wt % DLTDP, and 1.2 wt % HCl are mixed with mineral aggregate batches to produce asphalt concrete. The aggregates used are typical Illinois limestone of 9.5 mm nominal maximum size. The aggregates are blended using SUPERPAVE procedures. The batch weight of each aggregate batch is 4700 grams. The batch weight of each modified asphalt binder is about 5% by weight of the total mix.

The modified asphalt binders are heated in a forced draft oven at a temperature of 150° C. The batch aggregates are also kept in the forced draft oven which is maintained at a temperature of 150° C. for a minimum of three hours before mixing. The batches of aggregates and modified asphalt binders are mixed at 150° C. using a 16 liter mechanical mixing bowl. The mixing continues until the aggregates are completely coated with the modified asphalt binder. The loose mixtures are aged in a forced draft oven maintained at about 135° C. for about 2 hours to simulate short-term aging and about 8 hours to simulate long-term aging. The mixtures are compacted after aging.

Compaction of the mixtures is done using a SUPERPAVE gyratory compactor. The compactor operated at 30 rpm. All of the samples are compacted to a height of 120 mm. Two 150 mm diameter compaction molds are used. The target compaction temperature is 135° C. After compaction, the samples are extruded from the compaction mold.

The aggregate-modified asphalt binder mixtures exhibit a higher resistance to aging compared to the aggregate-unmodified asphalt binder mixtures (i.e., control) under aging conditions that are simulated using the aging procedures described above. Mechanical tests are performed on the finished aggregate-asphalt mixtures to evaluate the resistance to aging. The mechanical tests include tensile strength, creep compliance, fracture test, and moisture damage. The tests show that the antioxidant treatment has superior resistance to aging compared to conventional antioxidant treatments and is effective in controlling age-hardening.

Although the antioxidant additives have been described above for use in asphalt binders, other uses of the antioxidant mixture are contemplated. For example, the combination of a thioester and aldehyde may be incorporated into polymeric materials to reduce oxidation of the polymeric materials.

It should be appreciated that the above described methods and compositions are capable of being incorporated in the form of a variety of embodiments, only a few of which have been illustrated and described above. The invention may be embodied in other forms without departing from its spirit or essential characteristics. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

The invention claimed is:

1. A modified asphalt binder composition made by the process comprising mixing an asphalt binder, an antioxidant composition, and an acidic catalyst to create a modified asphalt binder characterized by an aging index that is lower than that of an unmodified asphalt binder;
wherein the antioxidant composition comprises an aldehyde comprising furfural in an amount of about 2 wt % and a thioester comprising dilauryl thiodipropionate in an amount of about 1.5 wt %, each based on the weight of the asphalt binder; wherein the thioester and the aldehyde are present in an effective amount capable of decreasing an aging index based on a rutting parameter at 64° C., decreasing a fatigue parameter at 25° C. and decreasing a stiffness at −12° C., each parameter measured in accordance with SUPERPAVE, of an asphalt compared to the asphalt without the thioester or the aldehyde.

2. The modified asphalt binder composition of claim 1, wherein the aldehyde reacts with phenols in the asphalt binder to form phenolic resins, the phenolic resins comprising novolacs, resoles, or combinations thereof.

3. The modified asphalt binder composition of claim 1, wherein the thioester is bound to the asphalt binder to allow stabilization of the thioester.

4. The modified asphalt binder composition of claim 1, wherein the modified asphalt binder possesses at least about 50% lower flexural stiffness relative to an unmodified asphalt binder at a low temperature, the low temperature ranging from about −4° C. to about −58° C.

5. The modified asphalt binder composition of claim 1, wherein the modified asphalt binder possesses at least about 18% higher stiffness relative to an unmodified asphalt binder at a high temperature, the high temperature ranging from about 46° C. to about 82° C.

6. The modified asphalt binder composition of claim 1, further comprising an antistripping agent that promotes adhesion of the modified asphalt binder with a mineral aggregate.

7. An antioxidant modified asphalt binder prepared by the process comprising:
   (a) heating an asphalt binder in an oxidation rich environment to a first temperature sufficient to liquefy the asphalt binder;
   (b) adding an antioxidant mixture to the asphalt binder in the presence of an acidic catalyst to form the antioxidant modified asphalt binder, wherein the antioxidant mixture comprises an aldehyde comprising furfural in an amount of about 2 wt % and a thioester comprising dilauryl thiodipropionate in an amount of about 1.5 wt %, each based on the weight of the asphalt binder, and further wherein the thioester is added in a ratio of the aldehyde to the thioester that ranges between about 1:5 and about 5:1 parts by weight, and the thioester and the aldehyde are present in an effective amount capable of decreasing a rutting parameter at 64° C., decreasing a fatigue parameter at 25° C. and decreasing a stiffness at −12° C., each parameter measured in accordance with SUPERPAVE, of an asphalt compared to the asphalt without both the thioester and the aldehyde; and
   (c) mixing the antioxidant modified asphalt binder at a second temperature between about 85° C. and about 135° C. blend until a predetermined stiffness of the antioxidant modified asphalt binder has been attained.

8. The antioxidant modified asphalt binder of claim 7, further prepared by the process of:
   (d) adding an antistripping agent to the antioxidant modified asphalt binder, wherein the antistripping agent promotes adhesion of the antioxidant modified asphalt binder with a mineral aggregate.

9. The antioxidant modified asphalt binder of claim 7, wherein the first temperature is between about 80° C. and about 200° C.

10. The antioxidant modified asphalt binder of claim 7, wherein the acidic catalyst is selected from the group consisting of sulfuric acid, toluene sulfonic acid, paratoluene sulfonic acid, ascorbic acid, phosphoric acid, and hydrochloric acid.

11. The antioxidant modified asphalt binder of claim 7, wherein the antioxidant modified asphalt binder is characterized by an aging index that is lower than that of an untreated unmodified asphalt binder.

12. The antioxidant modified asphalt binder of claim 7, wherein the antioxidant modified asphalt binder possesses a reduction in flexural stiffness relative to that of an unmodified asphalt binder.

13. The antioxidant modified asphalt binder of claim 7, wherein the antioxidant modified asphalt binder possesses a higher complex shear modulus relative to that of an unmodified asphalt binder.

14. The antioxidant modified asphalt binder of claim 7, wherein the asphalt binder is selected from the group consisting of a joint sealant, recycled asphalt pavement, emulsion, cut-back, and naturally occurring asphalt.

15. The antioxidant modified asphalt binder of claim 7, wherein the antioxidant mixture is capable of improving the performance grade of the asphalt binder by extending the temperature range that the asphalt binder can be used within.

16. The antioxidant modified asphalt binder of claim 7, wherein the process further comprises:
   (d) coating the antioxidant modified asphalt binder onto a surface of a mineral aggregate.

\* \* \* \* \*

UNITED STATES PATENT AND TRADEMARK OFFICE
CERTIFICATE OF CORRECTION

PATENT NO. : 9,605,104 B2
APPLICATION NO. : 12/751117
DATED : March 28, 2017
INVENTOR(S) : Alex K. Apeagyei et al.

Page 1 of 1

It is certified that error appears in the above-identified patent and that said Letters Patent is hereby corrected as shown below:

In the Specification

In Column 3, Line 43, before "to form a stable" replace "ROO.," with -- ROO•, --.

In Column 3, Line 46, after "free radical" replace "(R.)," with -- (R•), --.

In Column 3, Line 47, after "free radical" replace "ROO." with -- ROO•. --.

In Column 3, Line 50, before "will react with other" replace "ROO." with -- ROO• --.

In Column 3, Line 51, after "asphalt free radicals" replace "(R.)" with -- (R•) --.

In Column 8, Line 8, after "defined in" replace "SUPERPRAVE" with -- SUPERPAVE --.

In Column 8, Line 22, before "Asphalt A are" replace "Eon" with -- E on --.

Signed and Sealed this
Sixth Day of June, 2017

Michelle K. Lee
*Director of the United States Patent and Trademark Office*